United States Patent
Jeon

(10) Patent No.: US 6,670,563 B1
(45) Date of Patent: Dec. 30, 2003

(54) ROTATION KEY DEVICE FOR A PORTABLE TERMINAL

(75) Inventor: Yong-Woo Jeon, Kumi-shi (KR)

(73) Assignee: Samsung Electronics Co., Ltd., Gyunggi-Do (KR)

( * ) Notice: Subject to any disclaimer, the term of this patent is extended or adjusted under 35 U.S.C. 154(b) by 0 days.

(21) Appl. No.: 10/356,552

(22) Filed: Feb. 3, 2003

(30) Foreign Application Priority Data

Dec. 3, 2002 (KR) .......................................... 2002-76194

(51) Int. Cl.7 .............................................. H01H 83/00
(52) U.S. Cl. .............................. 200/11 R; 200/110 A; 200/4
(58) Field of Search ............................ 200/11 R, 11 A, 200/110 A, 11 G, 13, 14, 4, 5 R, 7

(56) References Cited

U.S. PATENT DOCUMENTS

| | | | | |
|---|---|---|---|---|
| 4,392,030 A | * | 7/1983 | Buss | 200/11 R |
| 4,493,954 A | * | 1/1985 | Kimmel et al. | 200/11 R |
| 5,430,262 A | * | 7/1995 | Matsui et al. | 200/5 A |
| 6,049,044 A | * | 4/2000 | Mizobuchi | 200/4 |
| 6,236,002 B1 | * | 5/2001 | Chou | 200/4 |

* cited by examiner

Primary Examiner—Elvin Enad
Assistant Examiner—K. Lee
(74) Attorney, Agent, or Firm—Roylance, Abrams, Berdo & Goodman, LLP.

(57) ABSTRACT

A rotation key device for a portable terminal which includes a rotation key configured to rotate in forward and reverse directions. The rotation key device comprises a base plate, which is attached, at a lower surface thereof, to an upper surface of a first printed circuit board (PCB) mounted in a body of the portable terminal. The base plate is centrally provided at an upper surface thereof with a plurality of coupling protrusions in order to couple a second PCB, a ring-shaped washer, a rotation key, and a contact plate, to the base plate. A fixed button is coupled with the coupling protrusions of the base plate protruded from the contact plate, thereby retaining the second PCB, the ring-shaped washer, the rotation key, and the contact plate. The fixed button is centrally attached to the upper surface of the second PCB.

15 Claims, 15 Drawing Sheets

ROTATION KEY DEVICE FOR A PORTABLE TERMINAL

PRIORITY

This application claims priority to an application entitled "Rotation Key Device for Portable Terminal" filed in the Korean Industrial Property Office on Dec. 3, 2002 and assigned Serial No. 2002-76194, the contents of which are hereby incorporated by reference.

BACKGROUND OF THE INVENTION

1. Field of the Invention

The present invention relates to a rotation key device for a portable terminal, and more particularly to a rotation key device for a portable terminal which includes a rotation key configured to rotate in forward and reverse directions, thereby being capable of rapidly achieving selection and confirmation of a desired operating mode function.

2. Description of the Related Art

Generally, bar type wireless terminals are configured to have a bar-shaped single housing. Flip type wireless terminals are configured such that a flip or cover is rotatably mounted to a bar-shaped housing by means of a hinge device, whereas folder type wireless terminals are configured such that a folder is rotatably mounted to a bar-shaped housing by means of a hinge device so that it is foldable. Such conventional portable terminals are often equipped with an antenna unit, a data input/output unit, and a data transmitting/receiving unit. As is well known, a key pad is commonly used as the data input/output unit which is configured to input data when the keys provided thereon are depressed by a user's finger. A touch pad or touch screen is also often used. In order to perform a function for displaying data generated in accordance with an operation of the data input/output unit, a liquid crystal display (LCD) is commonly used. The keypad used to input data has an arrangement of a plurality of keys which includes a conversation start button (i.e., a send (SND) key), a cancel key, a correction or clear (CLR) key, numeral keys, character keys, an end (END) key, function keys, a power (PWR) key, among others. Typically, 15 or 20 of such keys are arranged at desired positions on the upper surface of the housing of a portable terminal, respectively, so that they are outwardly exposed. As the user presses selected each of the exposed keys, desired data is inputted.

The construction of a conventional portable terminal equipped with such keys will be described with reference to FIGS. 1 and 2. As shown in FIGS. 1 and 2, the conventional portable terminal, which is of a folder type, includes two parts: a body 10 and a folder 20. The body 10 carries a key button 11, four-direction adjusting keys 12, telephone keys 14 and a microphone 13, whereas the folder 20 carries an LCD 21, and a speaker 22. A hinge unit 30 is mounted between the body 10 and the folder 20. An antenna 40 is provided at the upper end of the body 10. The portable terminal also includes a switch unit which comprises a plurality of dome switches 60 in order to create pleasant tactile feeling when touched. As shown in FIG. 2, the dome switches 60 are provided at a printed circuit board (PCB) 50 mounted in the body 10 and formed with desired circuits. When a selected one of the dome switches 60 comes into contact with a corresponding contact 51 on the PCB 50 in accordance with a key pressing manipulation by the user, an associated signal is generated. The dome switch 60 is configured to sense the contact signal generated in response to the pressing manipulation by the user.

On respective dome switches 60 having such a configuration are disposed the key button 11 and 4-direction adjusting keys 12 respectively arranged at upper, lower, left and right positions, and adapted to perform various functions. Using the conventional key button and 4-direction adjusting keys equipped in the body of the conventional portable terminal, the user selects a desired sequence of keys in association with a desired operating mode function. However, this procedure is inconvenient to the user, because the key sequence required to select and then confirm the operating mode function is complex. It is therefore impossible to achieve a rapid function switching operation. Furthermore, it is impossible to achieve a rapid mobile Internet search using the functions of the key button and 4-direction adjusting keys.

SUMMARY OF THE INVENTION

An object of the present invention is to substantially solve at least the above problems and/or disadvantages and to provide at least the advantages below. Accordingly, an object of the present invention is to provide a rotation key device for a portable terminal which includes a rotation key configured to rotate in forward and reverse directions, thereby being capable of rapidly selecting a desired sequence of keys in association with a desired operating mode function.

Another object of the invention is to provide a rotation key device for a portable terminal which includes a rotation key configured to rotate in forward and reverse directions, thereby being capable of rapidly achieving selection of a desired operating mode function, and provide rapid confirmation of the selected operating mode function.

In accordance with an embodiment of the present invention, these objects are accomplished by providing in an apparatus for inputting data by use of keys in a portable terminal, a rotation key device comprising a base plate attached, at a lower surface thereof, to an upper surface of a first printed circuit board (PCB) mounted in a body of the portable terminal by a first bonding member, the base plate being centrally provided at an upper surface thereof with a plurality of coupling protrusions. A second PCB is attached, at a lower surface thereof, to the upper surface of the base plate by a second bonding member while allowing the coupling protrusions to extend therethrough, the second PCB being provided at the lower surface thereof with a plurality of dome switches, and at an upper surface thereof with a plurality of contact surfaces. A ring-shaped washer is attached to the upper surface of the second PCB by a third bonding member. The rotation key device further comprises a rotation key supported by an upper surface of the ring-shaped washer so that it is rotatable in forward and reverse directions by an external force applied thereto, and a contact plate coupled to an upper surface of the rotation key to rotate along with the rotation key, the contact plate having a plurality of contact terminals each adapted to come into contact with one of the contact surfaces of the second PCB in a fixed state of the contact plate while coming into sequential contact with the contact surfaces of the second PCB during the rotation of the contact plate, thereby applying an electrical contact signal to each of the contact surfaces coming into contact therewith, so that a rotated position of the rotation key and a rotation direction of the rotation key are sensed. The rotation key device also further comprises a fixed button coupled with the coupling protrusions of the base plate extending through the second PCB, the ring-shaped washer, the rotation key, and the contact plate, thereby retaining the second PCB, the ring-shaped washer, the rotation key, and the contact plate. The fixed button is centrally attached to the upper surface of the second PCB by a fourth bonding member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
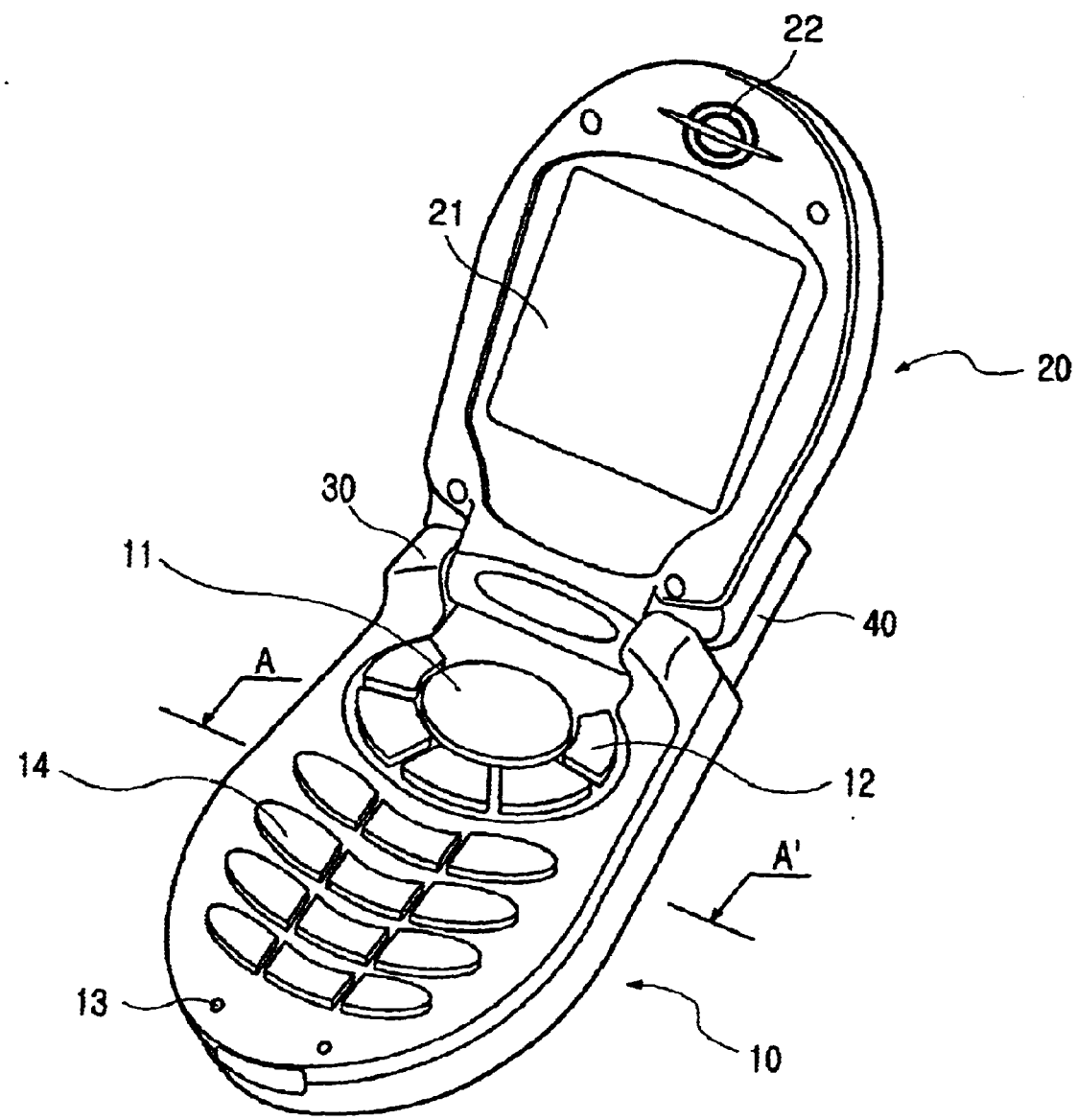
FIG. 1 is a perspective view illustrating a conventional folder type terminal in a state in which its folder is opened.
Figure 2:
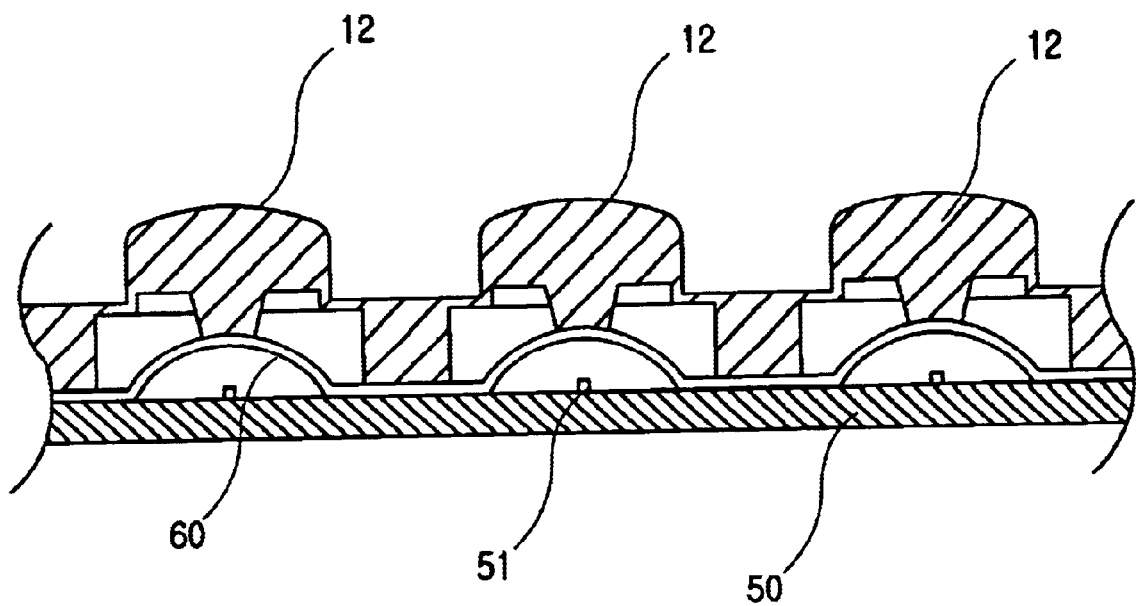
FIG. 2 is a cross-sectional view taken along the line A–A' of FIG. 1.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein have been omitted for conciseness.

Figure 3:
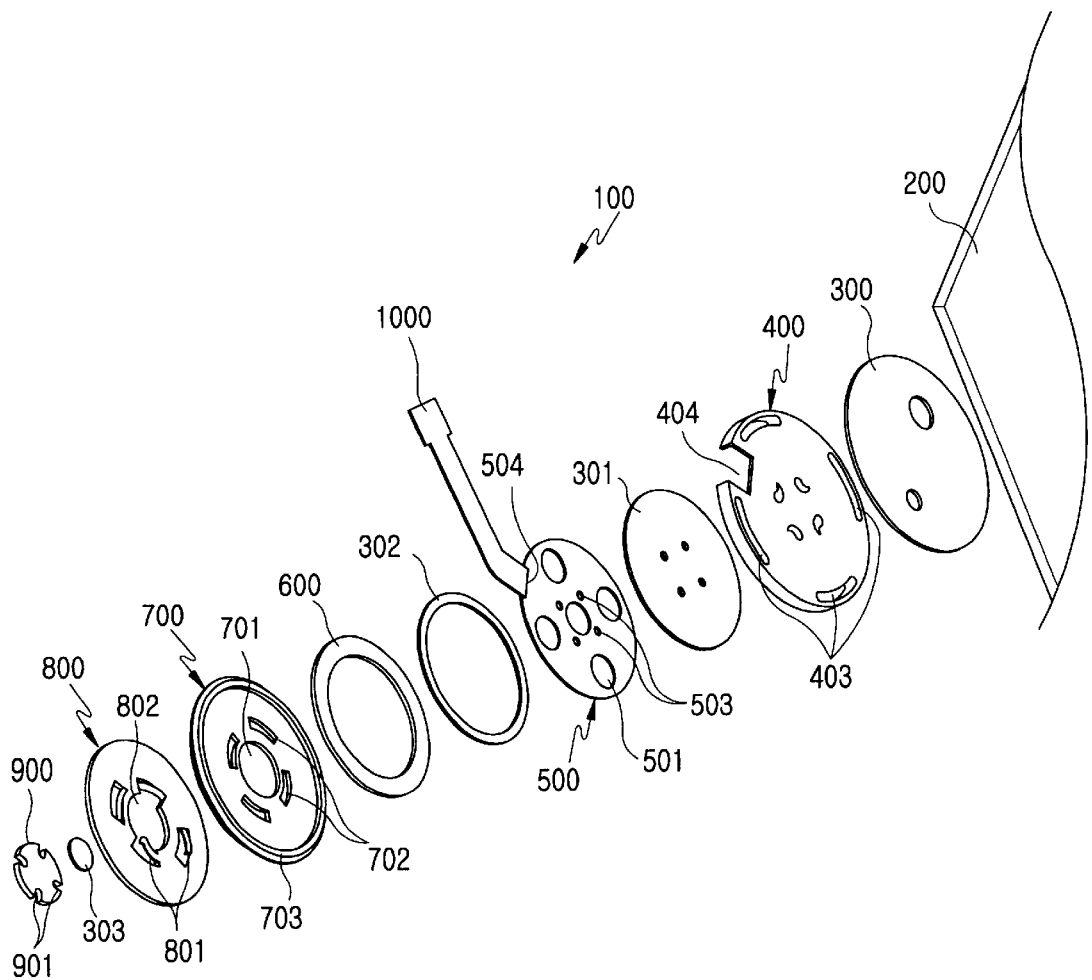
FIG. 3 is an exploded perspective view illustrating a rotation key device for a portable terminal in accordance with an embodiment of the present invention.
Figure 13:
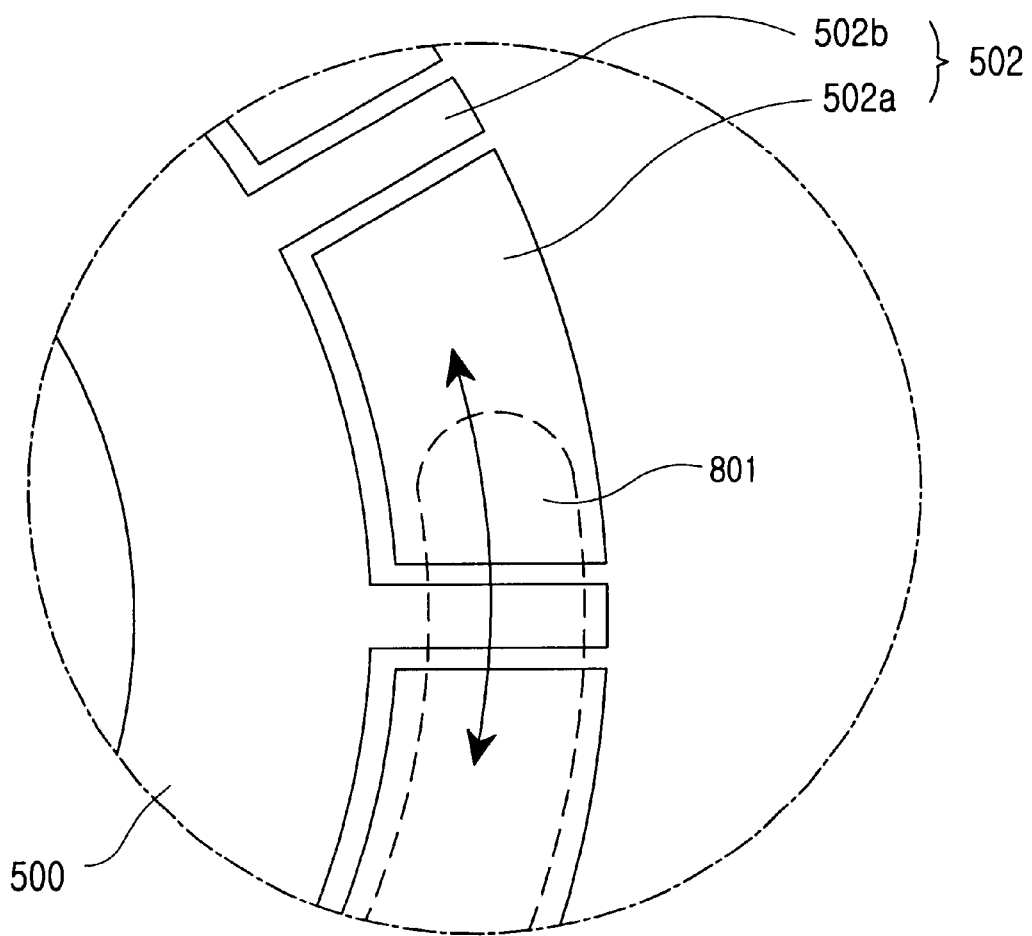
FIG. 13 is an enlarged sectional view corresponding to a portion "D" of FIG. 11, illustrating the state in which a contact terminal is separated from a contact surface.
Figure 14:
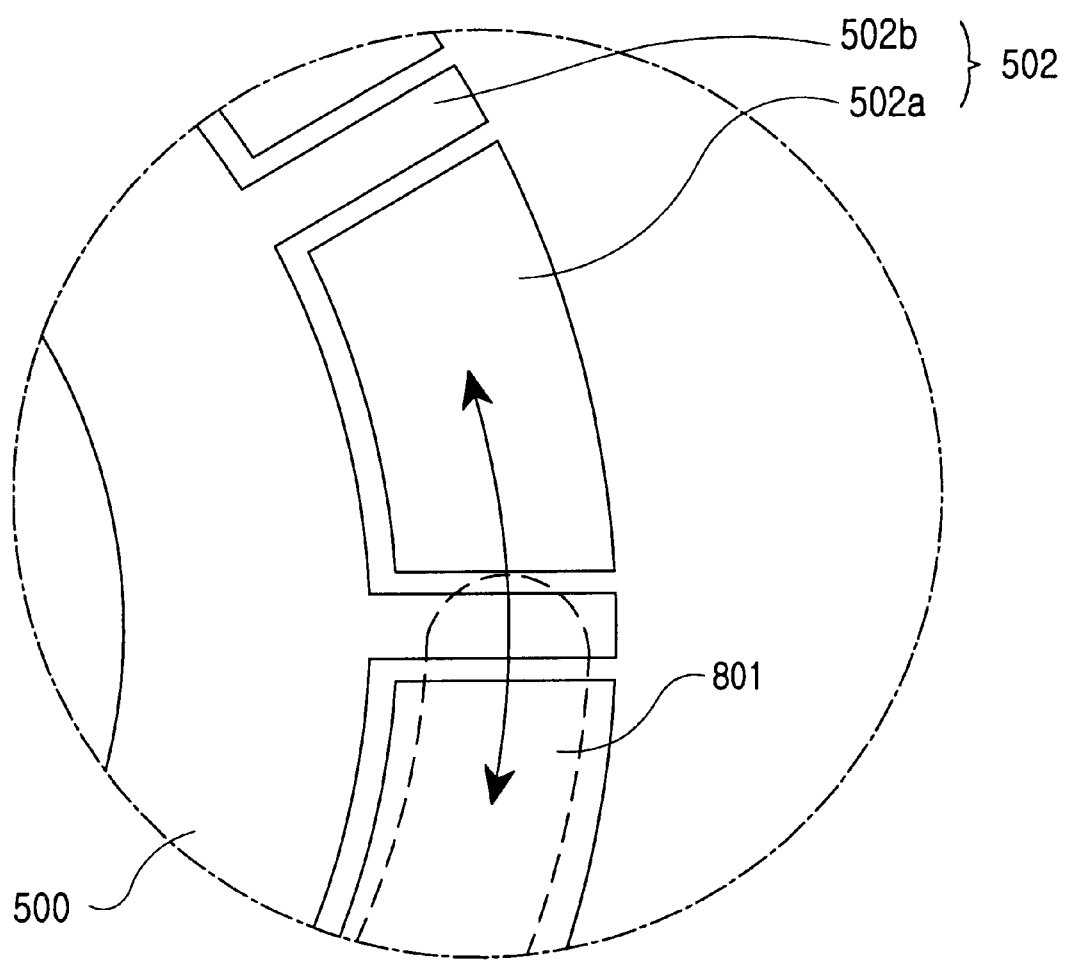
FIG. 14 is an enlarged sectional view corresponding to a portion "D" of FIG. 11, illustrating the state in which a contact terminal enters a contact surface.

Referring to the annexed drawings, in particular, FIG. 3, a rotation key device according to a preferred embodiment of the present invention is illustrated. This rotation key device is applied to a portable terminal which includes a terminal body provided with a PCB. In FIG. 3, the PCB of the terminal body is denoted by the reference numeral 200. As shown in FIG. 3, the rotation key device includes an apparatus body 100. The apparatus body 100 includes a base plate 400, a second PCB 500, a rotation key 700, a contact plate 800, and a fixed button 900, which are coupled to one another. A first bonding member 300 is attached to one surface (upper surface) of the base plate 400 so that the base plate 400 is bonded to an upper surface of the first PCB 200. A plurality of coupling protrusions 401 (shown in FIG. 4) are centrally provided at the other surface (lower surface) of the base plate 400 in order to couple the second PCB 500, rotation key 700, and contact plate 800, in this order, to the base plate 400. A plurality of dome switches 501 (five dome switches in the illustrated case) are provided at one surface (lower surface) of the second PCB 500. The second PCB 500 is bonded to the upper surface of the base plate 400 by means of a second bonding member 301. The second PCB 500 is formed with a plurality of contact surfaces 502 at the other surface (upper surface), each adapted to come into contact with any one of the contact terminals 801 of the contact plate 800. Contact between the plurality of contact surfaces 502 and contact terminals 801 occurs (see FIG. 13) when contact plate 800 is in a fixed state, or during the rotation of the contact plate 800 and provides reception of an electrical contact signal from the contact terminal.

The second PCB 500 is centrally, or substantially centrally provided with a plurality of first through holes 503, respectively adapted to allow the coupling protrusions 401 of the base plate 400 to extend therethrough. A ring-shaped washer 600 is attached to the upper surface of the second PCB 500 by means of a third bonding member 302, in order to allow the rotation key 700 to be rotatable. The rotation key 700 is laid on the upper surface of the ring-shaped washer 600 so that it is rotatable in forward and reverse directions by an external force applied thereto. A second through hole 701 is centrally formed in the rotation key 700 to allow the coupling protrusions 401 of the base plate 400 to extend therethrough. The rotating key 700 is also provided with a plurality of third through holes 702 around the second through hole 701. The third through holes 702 extend circumferentially while being substantially uniformly spaced apart from one another. Each third through hole 702 allows an associated one of the contact terminals 801 of the contact plate 800 to extend therethrough. The third through holes 702 are substantially symmetrically arranged such that they face each other. The rotation key 700 is also provided with a circumferential step 703 extending along the circumference of the rotation key 700. The circumferential step 703 engages with arc-shaped grooves 403 circumferentially formed at the base plate 400. Each contact terminal 801 of the contact plate 800 comes into contact with the contact surfaces 502 of the second PCB 500 (see FIG. 13) in a sequential fashion as the contact plate 800 rotates along with the rotation key 700. As described above, the contact terminals 801 face the upper surface of the rotation key 700 so that they come into contact with the contact surfaces 502 of the second PCB 500 in a fixed state or while being rotated in accordance with rotation of the rotation key 700, thereby applying electrical signals to those contact surfaces 502 of the second PCB 500.

The fixed button 900 (see FIG. 3) is coupled to the coupling protrusions 401 of the base plate 400, while being bonded to a central portion of the upper surface of the second PCB 500 by means of a fourth bonding member 303. The coupling protrusions 401 extend first through the second PCB 500, then through the washer 600, and finally the contact plate 800. Thus, the second PCB 500, washer 600, and contact plate 800 are coupled to the base plate 400 in a state of being seated on the base plate 400. The base plate 400 has a circular disc structure while being centrally provided with the coupling protrusions 401. Each coupling protrusion 401 of the base plate 400 has, at a free end thereof, a jaw 402 extending horizontally toward the center of the base plate 400 (see FIG. 5). The jaw 402 of each coupling protrusion 401 is forcibly extended through an associated one of the first through holes 503 of the second PCB 500, and then engaged with the second PCB 500 around the associated first through hole 503. The jaws 402 of the coupling protrusions 401 are symmetrically arranged such that they face each other. The arc-shaped grooves 403 are formed along the circumference of the base plate 400 so that they are engagable with the circumferential step 703 of the rotation key 700. Accordingly, the rotation key 700 is rotatable on the base plate 400 without being separated from the base plate 400.

A guide groove 404 is formed at a desired position on the circumference of the base plate 400. The guide groove 404 serves to guide a flexible PCB 1000 in contacting the second PCB 500. The base plate 400 has a plurality of support portions respectively adapted to support the dome switches 501 in a state in which the base plate 400 is coupled with the second PCB 500. In this coupled state, the coupling protrusions 401 of the base plate 400 extend through the first through holes 503 of the second PCB 500, respectively.

The second PCB 500 is provided, at a desired position on its circumference, with a contact portion 504 adapted to come into contact with the flexible PCB 1000 so that electrical contact signals applied to the second PCB 500 can be sent to the interior of the body 100 via the flexible PCB 1000. The contact surfaces 502 of the second PCB 500 comprise a plurality of first contact surfaces 502a formed at the upper surface of the second PCB 500 such that they are circumferentially arranged while being substantially uniformly spaced apart from one another.

When each first contact surface 502a comes into contact with any one of the contact terminals 801 of the contact plate 800 in a fixed state of the contact plate 800 or during the rotation of the contact plate 800, it receives an electrical contact signal from the contact terminal, and sends the received contact signal to the second PCB 500. The contact surfaces 502 of the second PCB 500 further comprise a plurality of second contact surfaces 502b each formed at the upper surface of the second PCB 500 between adjacent ones of the first contact surfaces 502a. When each second contact surface 502b comes into contact with any one of the contact terminals 801 of the contact plate 800 in a fixed state of the contact plate 800 or during the rotation of the contact plate 800, it receives an electrical contact signal from the contact terminal, and sends the received contact signal to the second PCB 500.

A fourth through hole 802 is centrally formed at the contact plate 800 so as to allow the coupling protrusions 401 of the base plate 400 to extend therethrough. The contact terminals 801 of the contact plate 800 are arranged to be substantially uniformly spaced apart from one another in a circumferential direction. Each contact terminal 801 is formed by cutting out a desired portion of the contact plate 800 to leave a portion corresponding the contact terminal 801, and then bending the left portion to be protruded toward the rotation key 700. Each contact terminal 801 extends through an associated one of the third through holes 702 of the rotation key 700 so that it comes into contact with one of the contact surfaces 502 of the second PCB 500. Each contact terminal 801 has a plate shape so as to achieve a reliable contacting operation thereof. Each contact terminal 801 has, at its free end, a bent portion 801a adapted to allow the contact terminal 801 to come into reliable contact with one of the contact surfaces 502 without interfering with the rotation of the contact plate 800. The contact plate 800 is made of a stainless steel material so that it is electrically conductive. A plurality of coupling grooves 901 are formed at the circumference of the fixed button 900. Each coupling groove 901 is engagable with an associated one of the coupling protrusions 401 of the base plate 400.

The assembling process and operation of the rotation key device having the above described configuration according to the embodiments of the present invention described above will now be described in detail with reference to FIGS. 3 to 20. As shown in FIG. 3, the first PCB 200 is first mounted in the body 10 of the portable terminal. Thereafter, the base plate 400 is attached, at its one surface, to the upper surface of the first PCB 200 by means of the first bonding member 300. The second bonding member 301 is then attached to the upper surface of the base plate 400 while allowing the coupling protrusions 401 of the base plate 400 to extend therethrough. The second PCB 500 is bonded at one surface thereof to the upper surface of the base plate 400 by means of the second bonding member 301. At this time, the coupling protrusions 401 of the base plate 400 extend through the first through holes 503 of the second PCB 500, respectively. As described above, the second PCB 500 is provided at one surface thereof with 5 dome switches 501, and at the other surface thereof with a plurality of contact surfaces 502. In this state, the third bonding member 302 is attached to the upper surface of the second PCB 500 such that the coupling protrusions 401 protruded from the second PCB 500 extend through the third bonding member 302. The ring-shaped washer 600 is then attached to the third bonding member 302 such that it is arranged around the circumference of the second PCB 500. Thus, the second PCB 500 and ring-shaped washer 600 are sequentially coupled to the base plate 400, as shown in FIGS. 7 to 10.

Figure 4:
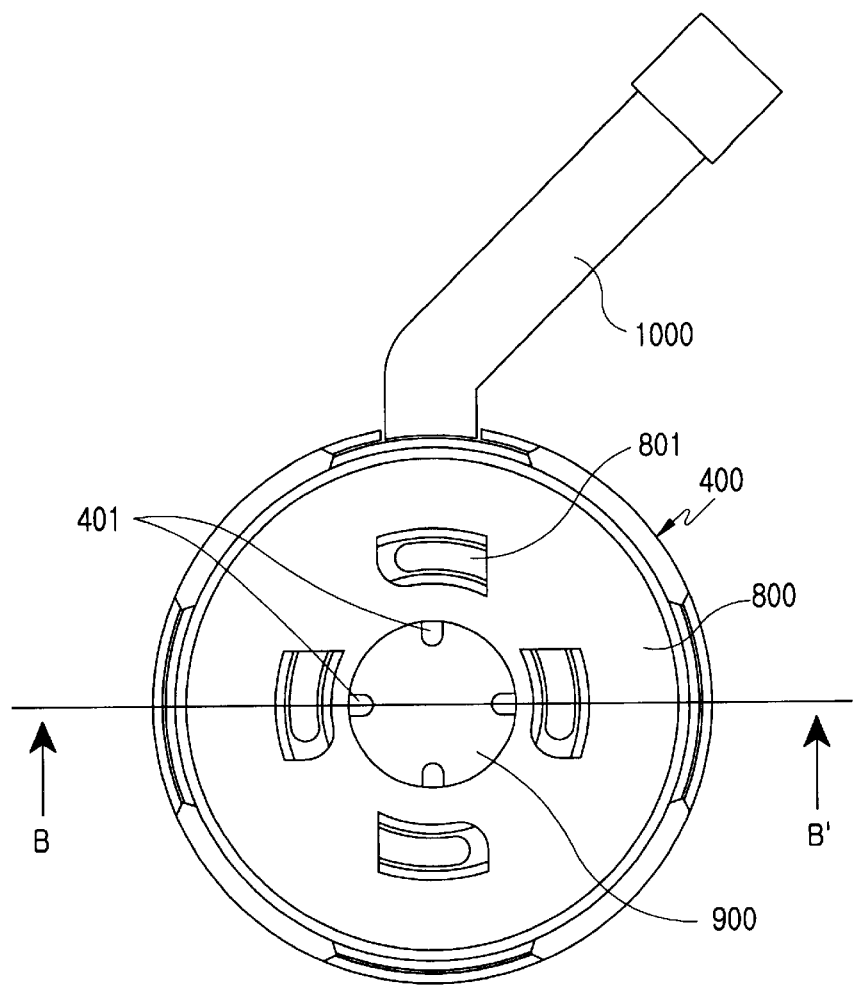
FIG. 4 is a perspective view illustrating an assembled state of the rotation key device according to an embodiment of the present invention.
Figure 5:
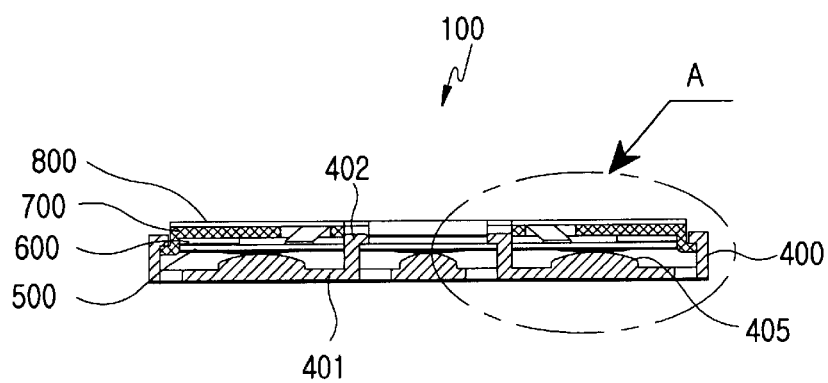
FIG. 5 is a cross-sectional view taken along the line B—B of FIG. 4.
Figure 6:
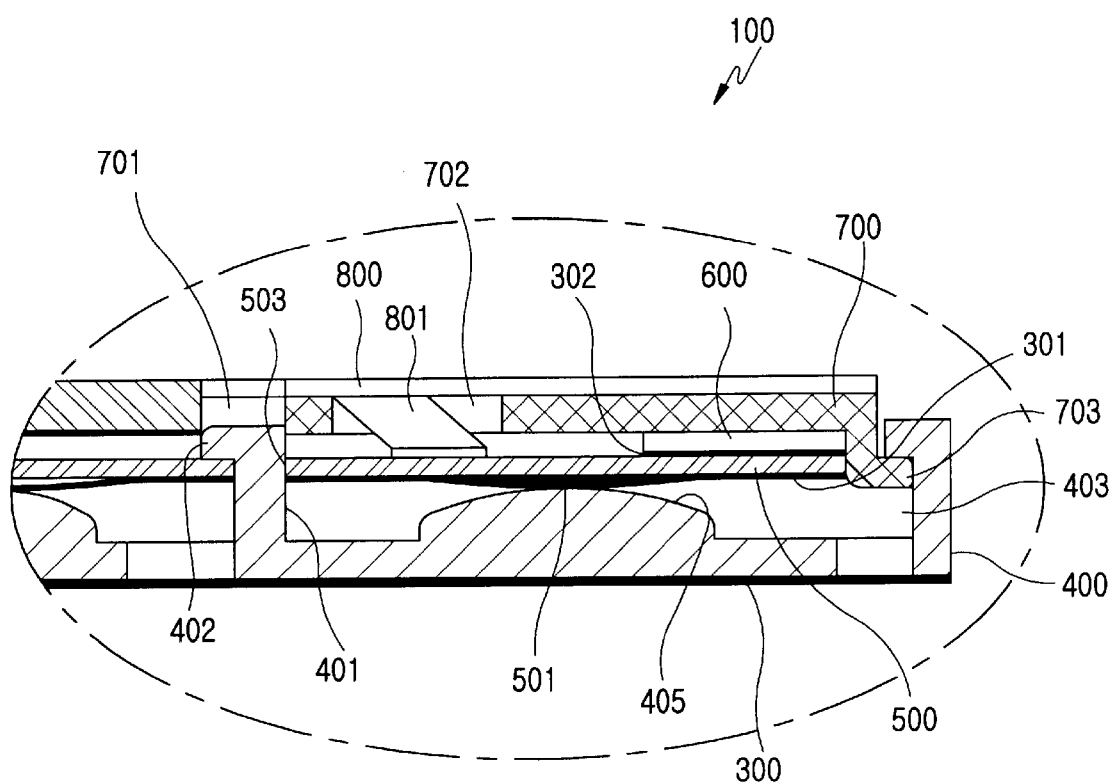
FIG. 6 is an enlarged sectional view corresponding to a portion "A" of FIG. 4.
Figure 7:
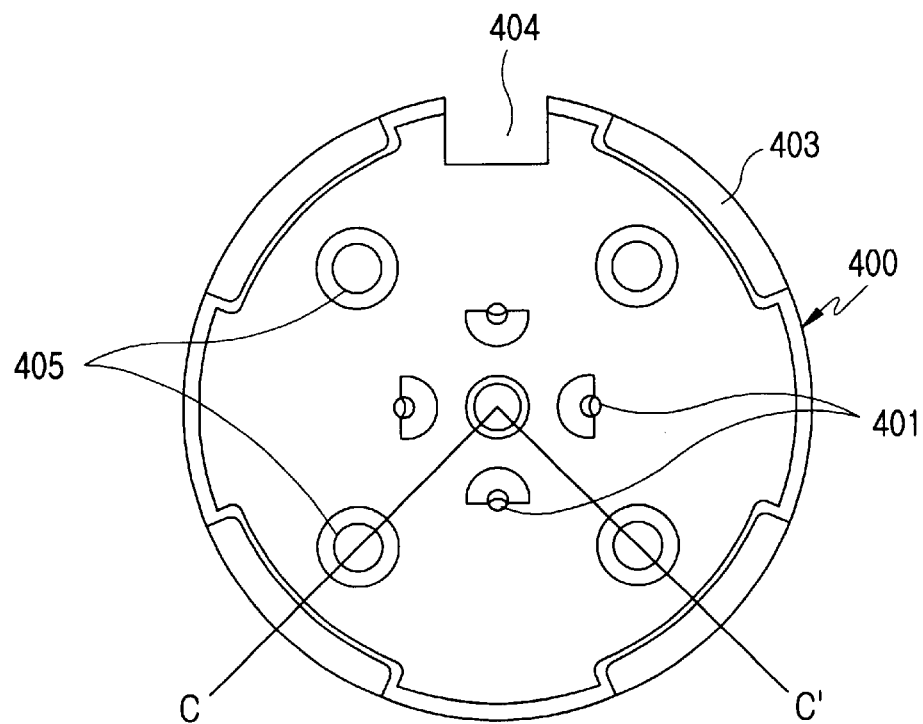
FIG. 7 is a plan view illustrating a base plate included in the rotation key device according to an embodiment of the present invention.
Figure 8:
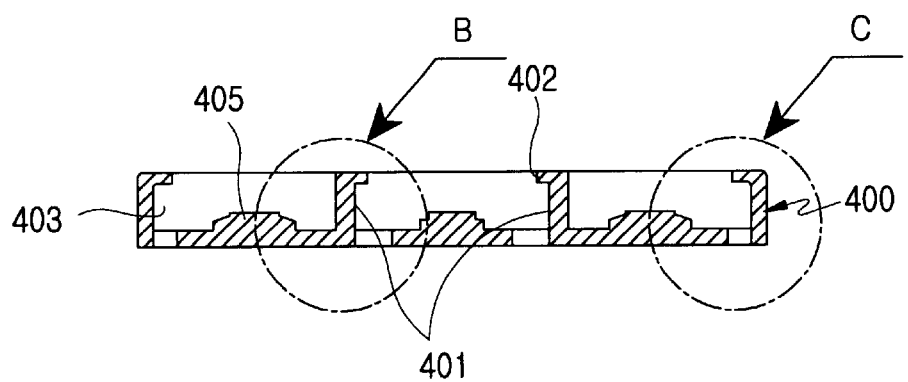
FIG. 8 is a cross-sectional view taken along the line C–C' of FIG. 7.
Figure 9:
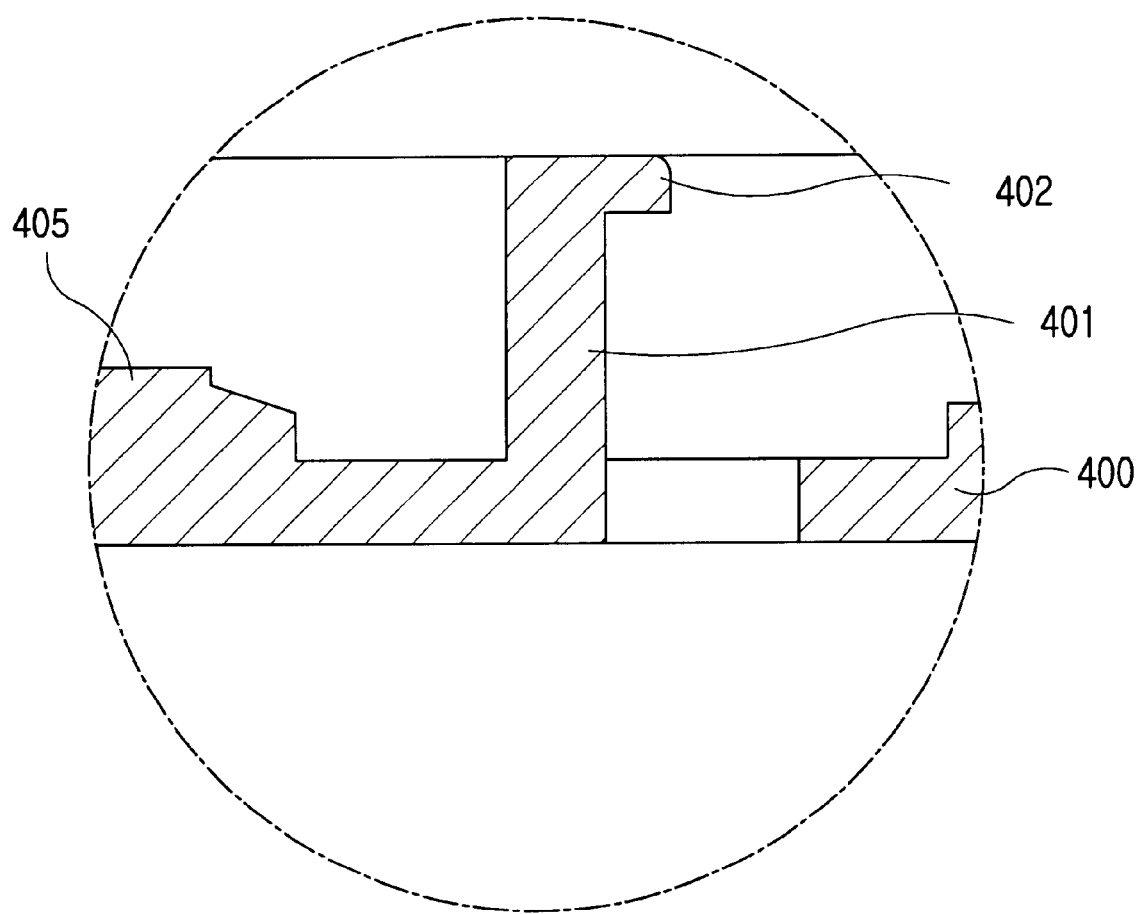
FIG. 9 is an enlarged sectional view corresponding to a portion "B" of FIG. 8.
Figure 10:
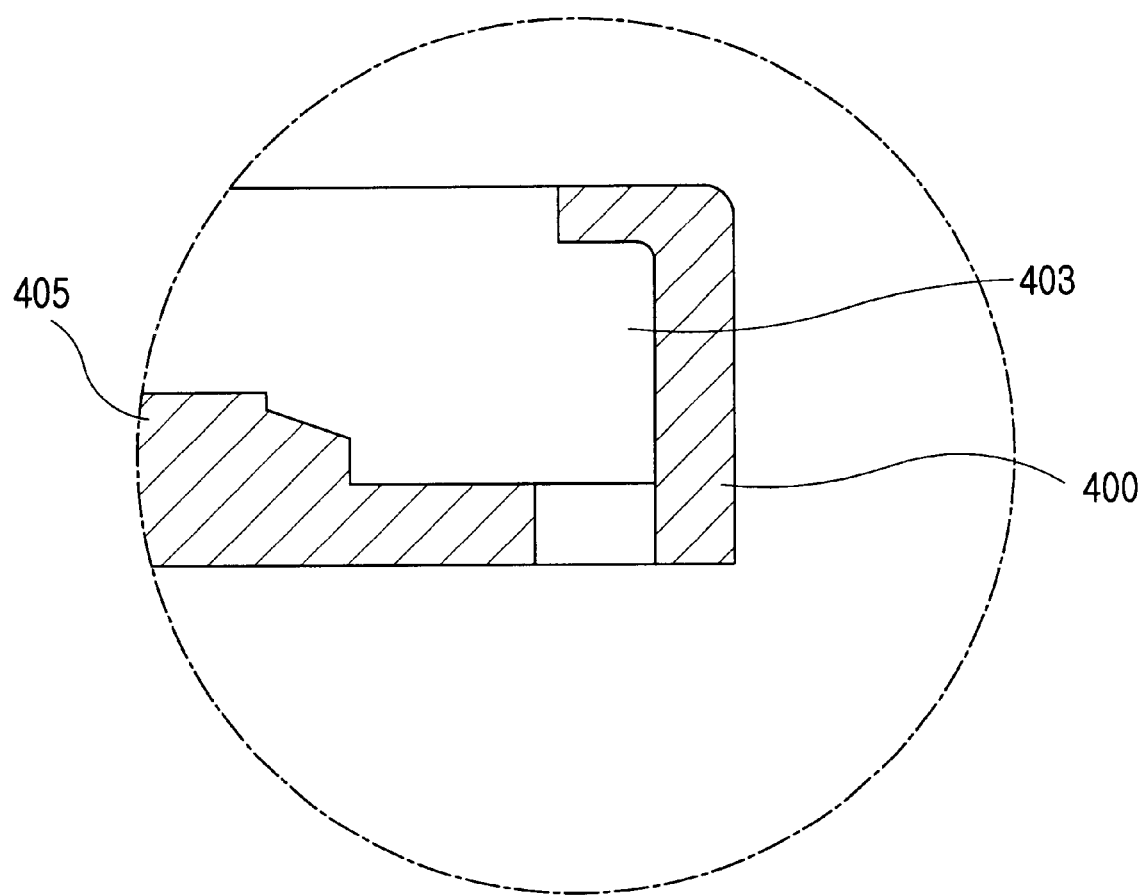
FIG. 10 is an enlarged sectional view corresponding to a portion "C" of FIG. 8.
Figure 11:
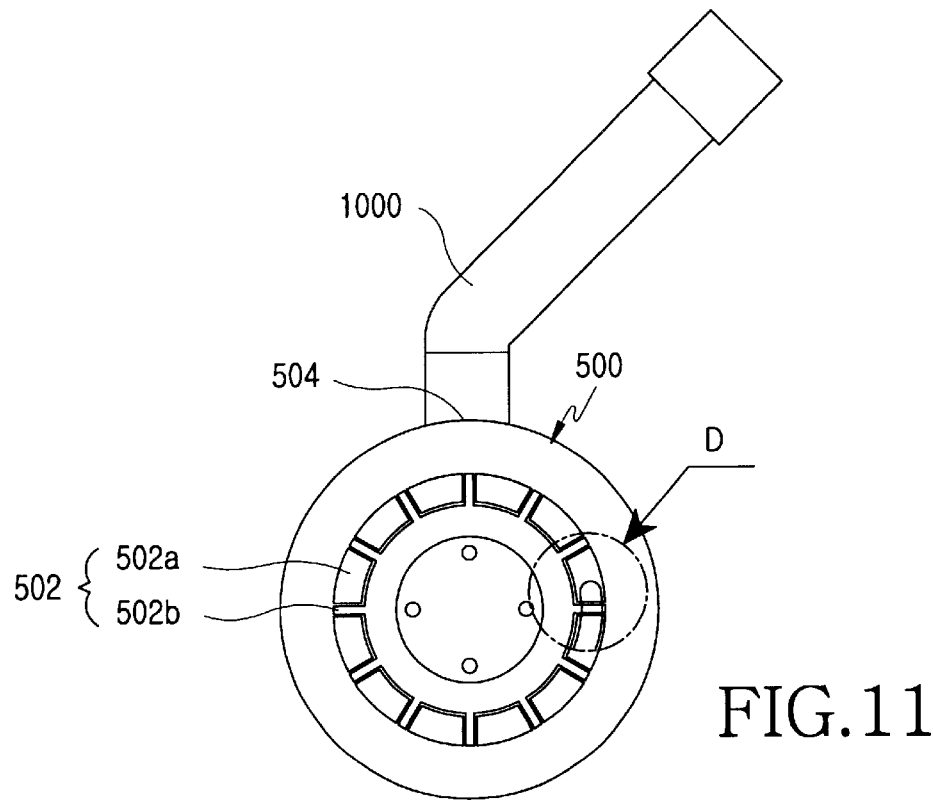
FIG. 11 is a plan view illustrating a second PCB included in the rotation key device according to an embodiment of the present invention.
Figure 12:
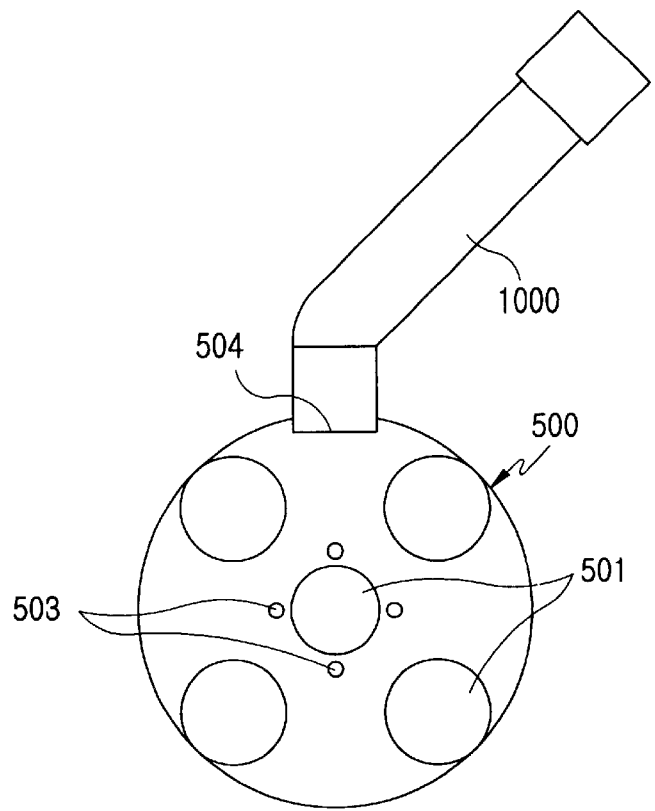
FIG. 12 is a bottom view illustrating the second PCB included in the rotation key device according to an embodiment of the present invention.
Figure 15:
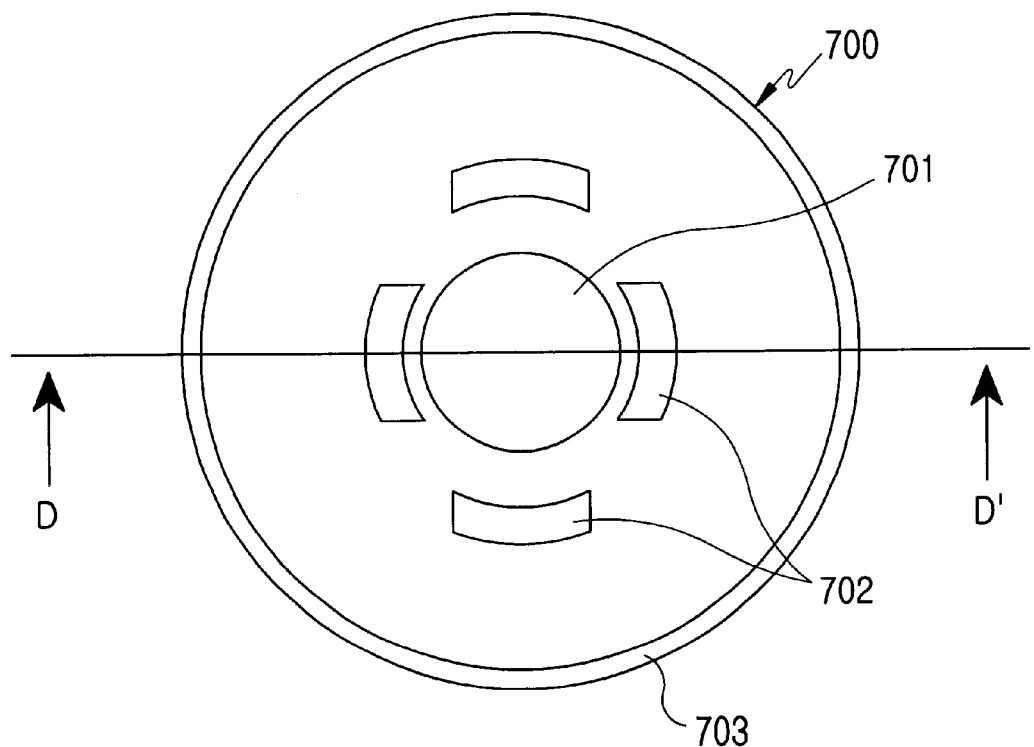
FIG. 15 is a plan view illustrating a rotation key included in the rotation key device according to an embodiment of the present invention.
Figure 16:
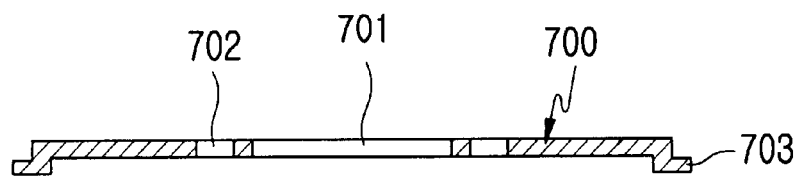
FIG. 16 is a cross-sectional view taken along the line D–D' of FIG. 15.
Figure 17:
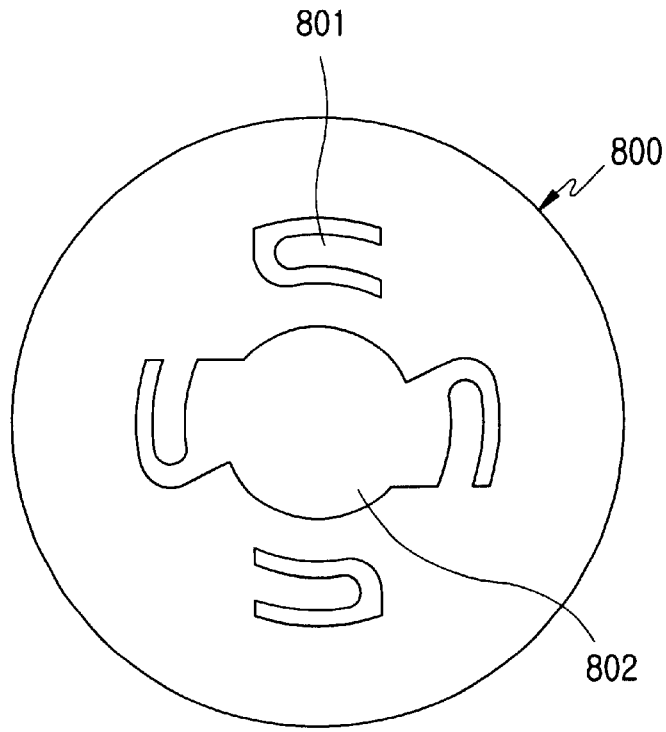
FIG. 17 is a plan view illustrating a contact plate included in the rotation key device according to an embodiment of the present invention.
Figure 18:
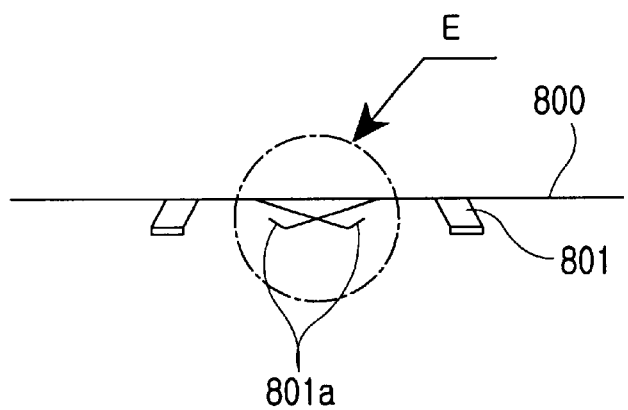
FIG. 18 is a sectional view illustrating the contact plate included in the rotation key device according to an embodiment of the present invention.
Figure 19:
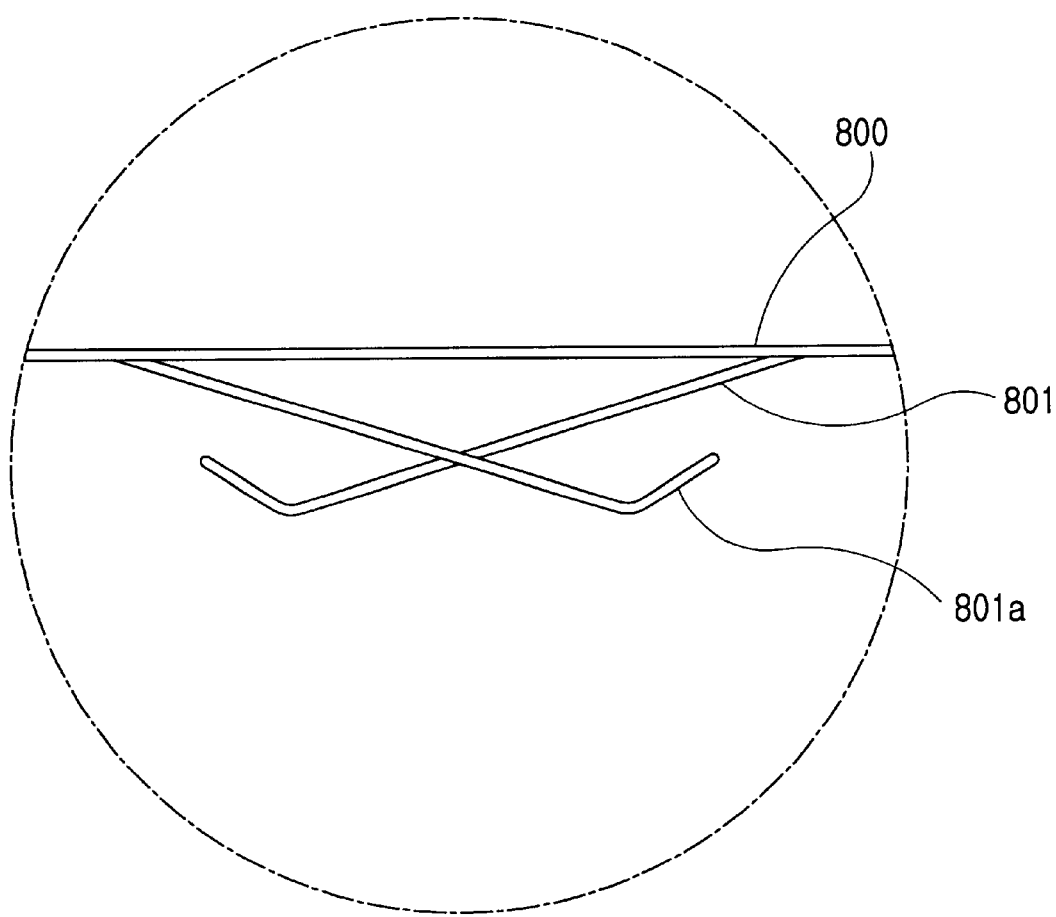
FIG. 19 is an enlarged sectional view corresponding to a portion "E" of FIG. 18.
Figure 20:
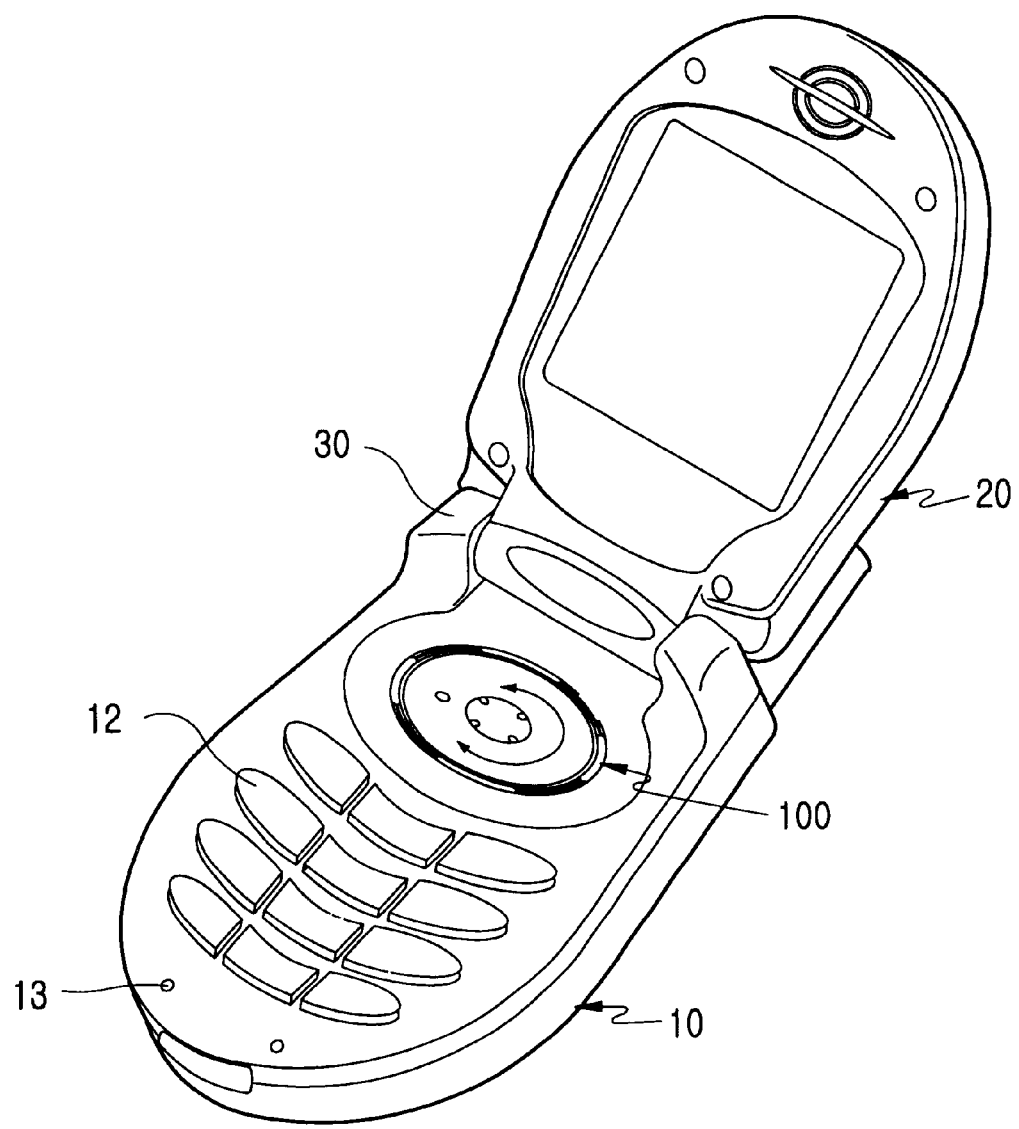
FIG. 20 is a perspective view illustrating a portable terminal, to which the rotation key device according to an embodiment of the present invention is applied, in a state in which its folder is opened.

Under this condition, the rotation key 700 is rotatably coupled to the base plate 400 such that its circumferential step 703 is rotatably engaged with the arc-shaped grooves 403 of the base plate 400, as shown in FIGS. 15 and 16. In this state, the rotation key 700 comes into contact with the ring-shaped washer 600, so that it can be effectively rotated in forward and reverse directions, as shown in FIGS. 4 and 5. As shown in FIG. 6, when the rotation key 700 is coupled to the base plate 400, the coupling protrusions 401 of the base plate 400 extend through the second through hole 701 centrally formed at the rotation key 700. Under this condition, the contact plate 800 is coupled to the upper surface of the rotation key 700, as shown in FIGS. 17 and 18.

As described above, the rotating key 700 is also provided with the third through holes extending circumferentially while being substantially uniformly spaced apart from one another. Each third through hole 702 allows an associated one of the contact terminals 801 of the contact plate 800 to extend therethrough. The third through holes 702 are substantially symmetrically arranged such that they face each other. Accordingly, when the contact plate 800 is coupled to the upper surface of the rotation key 700, its contact terminals 801 extend through the third through holes 702, and come into contact with the contact surfaces 502 of the second PCB 500. As described above, the contact terminals 801 of the contact plate 800 are arranged to be substantially uniformly spaced apart from one another in a circumferential direction. These contact terminals 801 are substantially symmetrically arranged such that they face each other, the facing ones of the contact terminals 801 cross each other in the rotating direction of the rotation key 700.

Each contact terminal 801 is formed by cutting out a desired portion of the contact plate 800 to leave a portion corresponding the contact terminal 801, and then bending the left portion to be protruded toward the rotation key 700. Each contact terminal 801 extends through an associated one of the third through holes 702 of the rotation key 700 so that it come into contact with one of the contact surfaces 502 of the second PCB 500. Each contact terminal 801 has a plate shape so as to achieve a reliable contacting operation thereof. Each contact terminal 801 also has, at its free end, the bent portion 801a adapted to allow the contact terminal 801 to come into reliable contact with one of the contact surfaces 502 without interfering with the rotation of the contact plate 800. Thereafter, the fixed button 900 is centrally attached to the upper surface of the second PCB 500 by means of the fourth bonding member 303, as shown in FIGS. 3 and 4. At this time, the coupling grooves 901 formed at the fixed button 900 are coupled with the coupling protrusions 401 of the base plate 400, respectively. When the contact plate 800 is rotated under this condition, the rotation key 700 is also rotated.

As described above, the second PCB 500 is provided with the first and second contact surfaces 502a and 502b alternately formed at the upper surface of the second PCB 500 such that they are circumferentially arranged while being substantially uniformly spaced apart from one another. The first and second contact surfaces 502a and 502b can then receive electrical contact signals from the contact terminals 801 when contact plate 800 is in either a fixed or rotated state, thereby sensing a rotated position and direction of the rotation key 700. When each first contact surface 502a comes into contact with any one of the contact terminals 801 of the contact plate 800 in a fixed or rotated state of the contact plate 800, it receives an electrical contact signal from the contact terminal 801, and sends the received electrical contact signal to the second PCB 500. Similarly, when each second contact surface 502b comes into contact with any one of the contact terminals 801 of the contact plate 800 in either a fixed or rotated state of the contact plate 800, it receives an electrical contact signal from the contact terminal 801, and sends the received electrical contact signal to the second PCB 500.

A brief description will now be given of the sequence of electrical contact signals generated as each contact terminal 801 comes into contact with the first and second contact surfaces 502a and 502b in a sequential fashion in accordance with the rotation of the rotation key 700. It is assumed that the contact signals of the rotation key 700 correspond to "A", "B", "C", "D", and "E". When the rotation key 700 rotates in a forward direction, the contact signals from each contact terminal 801 are generated in a sequence of E-D-C-B-A-E . . . . On the other hand, when the rotation key 700 rotates in a reverse direction, the contact signals from the contact terminal 801 are generated in a sequence of A-B-C-D-E-A . . . . The sequence of contact signals from the contact terminal 801 are sent to the body 10 of the portable terminal via the flexible PCB 100 contacting the contact portion 504 of the second PCB 500. When the user selects a desired operation mode function while rotating the rotation key 700, and presses an associated button, an associated one of the dome switches 501 comes into contact with an associated contact of the second PCB 500. As a result, an electrical signal is applied to the second PCB 500, and then sent to the body 10 of the portable terminal via the flexible PCB 1000. The fixed button 900 performs one of operation mode functions given to the portable terminal, e.g., a cancel key function. When the user presses the fixed button 900, the central dome switch 501 comes into contact with an associated contact of the second PCB 500. As a result, an electrical signal is applied to the second PCB 500, and then sent to the body 10 of the portable terminal via the flexible PCB 1000.

Since the rotation key configured to rotate in forward and reverse directions is provided at the body 10 of the portable terminal in accordance with the present invention, it is possible to rapidly select a desired sequence of keys in association with a desired operating mode function in the portable terminal. It is also possible to rapidly and conveniently achieve the confirmation of the selected operating mode function.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. In an apparatus for inputting data by use of keys in a portable terminal, a rotation key device comprising:

a base plate attached, at a lower surface thereof, by a first bonding member to an upper surface of a first printed circuit board (PCB) mounted in a body of the portable terminal, the base plate being substantially centrally provided at an upper surface thereof with a plurality of coupling protrusions;

a second PCB attached, at a lower surface thereof, to the upper surface of the base plate by a second bonding member while allowing the coupling protrusions to extend therethrough, the second PCB being provided at the lower surface thereof with a plurality of dome switches, and at an upper surface thereof with a plurality of contact surfaces;

a ring-shaped washer attached to the upper surface of the second PCB by a third bonding member;

a rotation key supported by an upper surface of the ring-shaped washer so that it is rotatable in forward and reverse directions by an external force applied thereto;

a contact plate coupled to an upper surface of the rotation key to rotate along with the rotation key, the contact plate having a plurality of contact terminals each adapted to come into contact with one of the contact surfaces of the second PCB in a fixed state of the contact plate while coming into sequential contact with the contact surfaces of the second PCB during the rotation of the contact plate, thereby applying an electrical contact signal to each of the contact surfaces coming into contact therewith, so that a rotated position of the rotation key and a rotation direction of the rotation key are sensed; and a fixed button coupled with the coupling protrusions of the base plate extending through the second PCB, the ring-shaped washer, the rotation key, and the contact plate, thereby retaining the second PCB, the ring-shaped washer, the rotation key, and the contact plate, the fixed button being substantially centrally attached to the upper surface of the second PCB by a fourth bonding member.

2. The rotation key device according to claim 1, wherein the base plate has a substantially circular disc structure substantially centrally provided with the coupling protrusions.

3. The rotation key device according to claim 1, wherein each of the plurality of coupling protrusions of the base plate has, at a free end thereof, a jaw extending substantially horizontally toward a center of the base plate, the jaw being forcibly extended through an associated one of through holes formed at the second PCB, and then engaged with the second PCB around the associated through hole.

4. The rotation key device according to claim 1, wherein the base plate is further provided with:

a plurality of substantially uniformly spaced arc-shaped grooves formed along a circumference of the base plate so that they are engagable with a circumferential step formed at the rotation key, thereby allowing the rotation key to be rotatable on the base plate without being separated from the base plate;

a guide groove formed at a desired position on the circumference of the base plate, and adapted to guide a flexible PCB contacting the second PCB; and a plurality of support portions respectively adapted to support the dome switches in a state in which the base plate is coupled with the second PCB.

5. The rotation key device according to claim 3, wherein the jaws of the coupling protrusions are substantially symmetrically arranged so that they face each other, and the arc-shaped grooves are substantially symmetrically arranged so that they face each other.

6. The rotation key device according to claim 1, wherein the second PCB is further provided with:

a plurality of through holes arranged at a central portion of the second PCB, and adapted to allow the coupling protrusions to extend therethrough; and a contact portion arranged at a desired position on a circumference of the second PCB, and adapted to come into contact with a flexible PCB.

7. The rotation key device according to claim 1, wherein the contact surfaces comprise:

a plurality of first contact surfaces formed at the upper surface of the second PCB so that they are circumferentially arranged while being substantially uniformly spaced apart from one another, each of the first contact surface receiving an electrical contact signal from one of the contact terminals coming into contact therewith in a fixed state of the contact plate or during the rotation of the contact plate; and a plurality of second contact surfaces each formed at the upper surface of the second PCB between adjacent ones of the first contact surfaces, each of the second contact surface receiving an electrical contact signal from one of the contact terminals coming into contact therewith in a fixed state of the contact plate or during the rotation of the contact plate.

8. The rotation key device according to claim 1, wherein the rotation key is provided with:

an inner through hole formed at a central portion of the rotation key to allow the coupling protrusions to extend therethrough;

a plurality of outer through holes formed around the inner through hole while extending circumferentially to be substantially uniformly spaced apart from one another, each of the outer through holes allowing an associated one of the contact terminals to extend therethrough; and a circumferential step extending along a circumference of the rotation key, the circumferential step engaging with arc-shaped grooves circumferentially formed at the base plate.

9. The rotation key device according to claim 8, wherein the plurality of outer through holes are substantially symmetrically arranged so that they face each other.

10. The rotation key device according to claim 1, wherein the contact plate further has a through hole formed at a substantially central portion of the contact plate to allow the coupling protrusions to extend therethrough.

11. The rotation key device according to claim 1, wherein each of the plurality of contact terminals of the contact plate is formed by cutting out a desired portion of the contact plate to leave a portion corresponding the contact terminal, and then bending the left portion to be protruded toward the rotation key, and each of the plurality of contact terminals has a plate shape, and extends through an associated one of through holes formed at the rotation key so that it come into contact with one of the contact surfaces of the second PCB.

12. The rotation key device according to claim 1, wherein the plurality of contact terminals are substantially symmetrically arranged to face each other, and the facing ones of the plurality of contact terminals cross each other in a rotating direction of the rotation key.

13. The rotation key device according to claim 1, wherein each of the contact terminals has, at a free end thereof, a bent portion adapted to allow the contact terminal to come into contact with one of the contact surfaces.

14. The rotation key device according to claim 1, wherein the contact plate is made of a stainless steel material.

15. The rotation key device according to claim 1, wherein the fixed button is provided at a circumference thereof with a plurality of coupling grooves respectively engagable with the coupling protrusions of the base plate.

* * * * *